United States Patent [19]

Cowan et al.

[11] Patent Number: 5,207,830
[45] Date of Patent: May 4, 1993

[54] LIGHTWEIGHT PARTICULATE CEMENTITIOUS MATERIALS AND PROCESS FOR PRODUCING SAME

[75] Inventors: Jack C. Cowan, Lafayette, La.; Roy F. House, Houston, Tex.; Andree' H. Harrington, Lafayette, La.

[73] Assignee: Venture Innovations, Inc., Lafayette, La.

[21] Appl. No.: 659,177

[22] Filed: Feb. 22, 1991

Related U.S. Application Data

[63] Continuation-in-part of Ser. No. 498,097, Mar. 21, 1990.

[51] Int. Cl.$^5$ .................. C04B 7/02; A01K 1/015
[52] U.S. Cl. ........................ 106/672; 106/703; 106/716; 106/764; 119/171; 119/173; 428/404
[58] Field of Search .............. 119/1, 171, 172, 173; 502/80; 106/672, 703, 716, 764; 428/387, 404

[56] References Cited

U.S. PATENT DOCUMENTS 4,278,047  7/1981  Luca ............................ 119/173
4,570,573  2/1986  Lohman ....................... 119/172
4,676,196  6/1987  Lojck et al. ................. 119/171

FOREIGN PATENT DOCUMENTS 3644826  7/1987  Fed. Rep. of Germany ...... 119/172
4222639  1/1965  Japan ........................... 106/86
0074528  4/1986  Japan ........................... 119/171
2169484  7/1986  United Kingdom ............. 119/171

Primary Examiner—Mark L. Bell
Assistant Examiner—P. Marcantoni
Attorney, Agent, or Firm—Roy F. House

[57] ABSTRACT

Disclosed is a process of manufacturing a lightweight particulate cementitious composition particularly adapted to the sorption of liquids comprising adding to a foamed cement slurry a particle forming agent, and aging the treated foamed slurry for a period of time sufficient for the particles to form and harden for subsequent handling. The bulk density, particle size distribution, and concentration of the agent are selected such that the cementitious composition has the desired density and such that at least 65% of the particles obtained after aging have the desired particle size.

21 Claims, No Drawings

LIGHTWEIGHT PARTICULATE CEMENTITIOUS MATERIALS AND PROCESS FOR PRODUCING SAME

This application is a continuation-in-part of co-pending patent application Ser. No. 07/498,097 filed Mar. 21, 1990.

FIELD OF THE INVENTION

The invention pertains to sorbents, particularly for aqueous liquids such as animal urine, and a process for producing such sorbents from cementitious materials.

BACKGROUND OF THE INVENTION

Heretofore, many efforts have been made to develop an effective and inexpensive litter for animals, especially household pets, particularly cats. Thus it has been disclosed in various patents to use alone or in various combinations urine sorptive materials, odor-inhibiting or control chemicals or materials, anti-oxidants, microbial inhibitors, surfactants, dyes, anti-static agents, flame retardants, binders, encapsulants, neutralizing agents, weighting or density control agents, and other materials. Representative of the many materials disclosed to provide one or more of these characteristics are: siliceous minerals such as natural or synthetic clays (bentonite, attapulgite, fuller's earth, sepiolite, kaolin), diatomaceous earth, mica, talc, sand, finely divided quartz, vermiculite, perlite, fly ash, pumice, zeolite molecular sieves, opalite, bottom ash, boiler slag, synthetic porous silicas and silicates, hydrophobic microporous crystalline tectosilicates of regular geometry having aluminum-free sites in a siliceous lattice, and the like; natural or agriculturally-grown materials and by-products thereof, such as chlorophyll-containing materials (alfalfa, algae, broome grass, timothy grass, metallic chlorophyllin salts, stems and leaves of leaf meal such as ipilipil niseacacia, etc.), permit shells, cedar, wood shavings, sawdust, wood flour, bagasse, corncobs, sugar beet pulp, citrus pulp, alpha-cellulose fiber stock, sulphite cellulosic paper stock, waste paper, paper sludge, hay, husks, bark, straw, gelatinizable carbohydrates, sunflower hulls, partially pyrolyzed cellulosic materials, sagebrush, sorghum, cotton seed hulls, popcorn, peat moss, tomato pumice, grain, potato, cereal or grain hulls such as corn, rice, wheat, oats, and the like, apple pulp and grape pulp; foamed plastics (polystyrene, polyurethanes, phenolic resins, cellular cellulose acetate, etc.); porous plastic beads; cloth, synthetic sorptive granules based on commercial grade plaster (calcium sulfate dihydrate); wax or paraffin coated hydrophobic substantially non-sorbent and non-water wettable granular material; porous inorganic material which has been uniformly contacted with a gaseous or liquid acidic substance to neutralize alkalinity therein and provide a pH between 5.8 and 6.2; porous inorganic material treated with a water-soluble zinc salt having a pH from approximately 7 to 9; absorbent pads; calcium carbonate; Portland cement; activated carbon; alumina; coal residues; recycled molasses serum; in-situ polymerized monomer or monomers containing at least one acidic functional group present in the molecule; water soluble or dispersible materials having colloidal properties in water including silicates, preferably alkali metal silicates, pyrophosphates, preferably alkali metal pyrophosphates, polysaccharides, preferably cellulose derivatives, alginates, or starch; polyvinylpyrrolidone; anhydrous sodium sulfate; citric acid; sodium chloride; sodium or ammonium persulfate and a buffering agent; water absorbent polymers; adhesive-type soluble lignin pelletizing aid; cyclodextrin; thermoplastic polymers; crosslinkable natural gums such as the polygalactomannan gums, xanthan gum, or alginate; pheromone-like attractant substances; a veterinary composition for preventing feline urological syndrome; Plaster of Paris, calcined alkaline earth metal oxides; aluminum sulfate; carbonates, bicarbonates; hydrogen phosphates; benzaldehyde green; rose bengal; certain quaternary ammonium compounds; proprionates; N-alkylpyridinium proprionates; halogenated aromatic hydrocarbons; undecylenic acid; aldehyde derivatives; thiocyanates; carbamates; azo chlorides; modified phenols; oxyalkylated alkylphenols; alkyl sulfate salts; alkylbenzene sulfonate salts; oxyalkylated alcohols; water soluble or dispersible gums and polymers, such as guar gum, micro-crystalline cellulose, pregelatinized starches, methacrylic and acrylic polymers and copolymers, cellulose derivatives (carboxymethyl cellulose, hydroxyethyl cellulose, methyl cellulose), polyvinyl alcohol, polyethylene oxides, carbohydrates, and proteins; starch graft copolymers and other so called super absorbents; camphane derivatives; various aromatic oils such as pine oil, citrus oils, oil of cloves, and cinnamon oil; methanol; camphor; sodium dihydrogen phosphate; potassium dihydrogen phosphate; potassium acid phthalate; cherry pit extract; certain hydroxamic acids and salts thereof; perfumes; fragrances; vitamin E; chlorine dioxide; sodium bicarbonate; gypsum; sagebrush oil; microencapsulated fragrance or deodorizer; salts of transition metals of Group Ib or Group IIb of the periodic table of the elements; ferrous sulphate heptahydrate; borax; and p-hydroxybenzoate.

In spite of the wide variety of materials and combination of materials disclosed for use as animal litter, particularly cat litter, there is still a need for a superior sorbent which eliminates the odors associated with the decomposition of animal urine.

A primary object of the present invention is to provide a process for the manufacture of lightweight particulate cementitious compositions useful as a sorbent for various liquids, such as the absorption of urine in cat litter boxes.

Another primary object of the present invention is to provide a lightweight particulate cementitious cat litter which can be manufactured at any desired location by environmentally acceptable processes requiring low energy input.

An object of this invention is to provide lightweight sorptive cementitious compositions which are adapted to be cohesive when wetted with an aqueous medium, such as urine.

Still another object of this invention is to provide methods for decreasing the odor from animal litter boxes utilizing the particulate cementitious sorbents of this invention.

Another object of this invention is to provide a method of making the particulate cementitious sorbents of this invention cohesive when wetted with an aqueous liquid, such as urine.

The improved sorbent compositions of the invention are produced from (a) a cementitious material such as Portland cement, alumina cement, gypsum cement, gypsum plaster, magnesia cement, and calcium-aluminate cement; (b) water which is used in processing; (c) an air entraining or foaming agent; (d) a particle forming agent; and, optionally, (e) plasticizers to reduce the water content during manufacture; (f) additives to improve the sorption capacity of the sorbents; and (g) other additives as desired to provide the sorbent compositions with any desired characteristics.

The sorbent compositions of this invention are produced by novel processes comprising: (I) - (1) forming a foamed aqueous slurry containing water and a cementitious material in a water to cementitious material weight ratio from about 0.2 to about 1.2, the slurry containing from about 0.1% to about 5% by weight of the water of a foaming surfactant, from 0% to about 10% based on the weight of the cementitious material of a sorption capacity increasing additive, and from 0% to about 20% based on the weight of the cementitious material of a plasticizer for the cementitious material; (2) mixing with the foamed slurry a particle forming agent; and (3) aging the foamed slurry for a period of time sufficient for the particles to form and harden for subsequent handling; wherein the bulk density, particle size, and concentration of the particle forming agent are selected such that the cementitious composition has the desired density and such that at least 65% of the particles have the desired particle size; or (II) - (1) forming an aqueous slurry containing water and a cementitious material in a water to cementitious material weight ratio from about 0.15 to about 1.0, the slurry containing from about 0% to about 20% based on the weight of the cementitious material of a plasticizer and from about 0.1% to about 5% by weight of the water of a surfactant; (2) foaming the aqueous slurry by either (a) vigorously mixing the slurry and entraining air therein, (b) mixing with the aqueous slurry a pre-formed foam containing from about 1% to about 10% by weight of a foaming agent, or (c) both (a) and (b); (3) mixing with the foamed slurry a particle forming agent; and (4) aging the foamed slurry for a period of time sufficient for the particles to form and harden for subsequent handling; wherein the bulk density, particle size, and concentration of the particle forming agent are selected such that the cementitious composition has the desired density and such that at least 65% of the particles have the desired particle size.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

The lightweight particulate cementitious materials of this invention are prepared by novel processes which maximize the percent recovery of particles in the desired particle size range. These processes comprise: (I) - (1) forming a foamed aqueous slurry containing water and a cementitious material in a water to cementitious material weight ratio from about 0.2 to about 1.2, the slurry containing from about 0.1% to about 5% by weight of the water of a foaming surfactant, from 0% to about 10% based on the weight of the cementitious material of a sorption capacity increasing additive, and from 0% to about 20% based on the weight of the cementitious material of a plasticizer for the cementitious material; (2) mixing with the foamed slurry a particle forming agent; and (3) aging the foamed slurry for a period of time sufficient for the particles to form and harden for subsequent handling; wherein the bulk density, particle size, and concentration of the particle forming agent are selected such that the cementitious composition have the desired bulk density and such that at least 65% of the particles have the desired particle size; or (II) - (1) forming an aqueous slurry containing water and a cementitious material in a water to cementitious material weight ratio from about 0.15 to about 1.0, the slurry containing from about 0% to about 20% based on the weight of the cementitious material of a plasticizer, from about 0.1% to about 5% by weight of the water of a surfactant, and from 0% to about 10% based on the weight of the cementitious material of a sorption capacity increasing additive; (2) foaming the aqueous slurry by either (a) vigorously mixing the slurry and entraining air therein, (b) mixing with the aqueous slurry a pre-formed foam containing from about 1% to about 10% by weight of a foaming agent, or (c) both (a) and (b); (3) mixing with the foamed slurry a particle forming agent; and (4) aging the foamed slurry for a period of time sufficient for the particles to form and harden for subsequent handling; wherein the bulk density, particle size, and concentration of the particle forming agent are selected such that the cementitious composition has the desired bulk density and such that at least 65% of the particles have the desired particle size.

These processes require that an aqueous cementitious material-containing slurry be foamed, and thereafter the foam is treated to form the lightweight particle sorbents. The slurry can be foamed using an in-situ foam generation process, mixing the slurry with a pre-formed foam, or combination thereof. In the in-situ form generation technique, a foaming agent (air-entraining agent) is incorporated into the slurry and the slurry is foamed while agitating the slurry. Compressed air or other non-flammable gas can be injected into the slurry while agitation to more quickly create the desired foam density. In the pre-formed foam process, a portion of the required water is admixed with a foaming agent and passed, generally with compressed air or other non-inflammable gas, through a foam generator to produce a foam which is then mixed into the slurry containing the remainder of the water and the cementitious material.

These processes can be characterized as follows. First the cementitious material and water are mixed to form a slurry having the desired water (W) to cement (C) weight ratio. Generally, a plasticizer will be added to the slurry, preferably to the water before adding the cementitious material, when the W/C ratio is less than about 0.4. If it is desired to incorporate a sorption capacity increasing additive in the sorbent, it is preferred that it be first dispersed in the water used to prepare the slurry before mixing the cement therein. However, it can be added to the slurry before or after the foaming thereof. A surfactant is added to the slurry. If the foam is to be generated in-situ, this surfactant must be an air-entraining or foaming agent. Thus when the slurry is agitated a foamed slurry will result. If the foamed slurry is prepared by a pre-foam process, then this surfactant need only be a surface active agent which is compatible with the foaming agent used to prepare the pre-foam. Thus if the foaming agent is non-ionic, the surfactant may be either non-ionic, cationic, or anionic. If the foaming agent is anionic, then the surfactant may be non-ionic and/or anionic. If the foaming is cationic, that the surfactant may be non-ionic and/or cationic. Preferably the surfactant is the same as the foaming agent used to prepare the pre-foam. The slurry is then foamed by either (a) entraining air therein, (b) mixing the slurry with the pre-formed foam, or both (a) and (b).

The foamed cementitious material-containing slurry is then treated such that a particulate sorbent is formed. This comprises mixing with the foamed slurry a particle forming agent. The bulk density, particle size, and concentration of the particle forming agent are selected such that the sorbent has the desired bulk density and such that at least 65% of the particles which are eventually formed have the desired particle size, preferably at least 70%, as discussed hereinafter. The foamed slurry is then aged in a suitable vessel for a period of time sufficient for the particles to form and harden for subsequent handling.

The particles are then dried and classified to obtain the particles having the desired particle size. The drying may be carried out at ambient or elevated temperatures. The more water removed on drying, the lower will be the bulk density and, generally, the greater will be the sorption capacity. Alternatively, the drying can be eliminated and the sorbent particles will naturally dry at ambient temperature when placed in the litter box. The classification of the particles may be accomplished by known processes such as sifting through screens or by utilizing air classifying equipment.

Some of the particles may be bound or cemented together into a cluster of particles upon drying. These clusters are easily broken up without the generation of fine particles to enhance the percent recovery of the particles having the desired size.

The treatment of the foamed cement slurry to form the lightweight particulate cementitious sorbents of this invention is unique and impressive. Depending upon the concentration of the particle forming agent, the particles may form rapidly or only after extended aging of the slurry for several hours. Once the particles form the foam breaks and there is no outward appearance that any foam ever existed after the particles have hardened sufficiently to be subsequently handled without crushing. Most of the particles are rounded, spheroidal or elipsoidal in shape. The strength of the particles is dependent upon their composition, and particularly on the weight ratio of water to cementitious material used in preparing the sorbent, the particular cementitious material and particle forming agent used, and the weight ratio of particle forming agent to cementitious material. The lower the water to cementitious material ratio, the greater will be the particle hardness and bulk density.

The cementitious materials useful in the practice of this invention are hydraulic substances which the property of undergoing a hydration reaction resulting in hardening. Typical examples of such substances are Portland cement, alumina cement, gypsum cement, gypsum plaster, magnesia cement, and calcium aluminate cement. Portland cement is preferred.

The air-entraining or foaming agents which are useful in the practice of this invention may be selected from any of the known surface active agents or surfactants which have been disclosed for use in preparing foamed cement. See for example the following U.S. patents, incorporated herein by reference: U.S. Pat. No. 3,782,983 (Komor); U.S. Pat. No. 3,963,507 (Kuramoto et al.); U.S. Pat. No. 4,019,916 (Golightly et al.); U.S. Pat. No. 4,046,582 (Kawamura et al.); U.S. Pat. No. 4,828,619 (Matsushita et al.); U.S. Pat. No. 4,836,855 (Caillan et al.). These patents, and patents referenced therein, disclose the use of Finsol resins; sulfate esters having the empirical formula

$R\text{-}(OCH_2CH_2)_nSO_4A$ wherein R is an alkyl group of about 8 to 10 carbon atoms or an alkyl-substituted aryl group such as phenyl or naphthyl wherein the alkyl group contains 2 to 7 carbon atoms and may be straight or branched chains, "n" is zero or an integer of one or above, preferably zero up to about 10, and A is H or a salt forming cation selected from the group consisting of alkali metal such as sodium, potassium, or lithium, $NH_4$ and mono-, di-, or tri-lower (1 to 6 carbon atoms) alkyl or alkylol amino and heterocyclic secondary amino groups; a foaming agent comprising:

1. as the foaming component, 0.05 to 20, preferably 0.1 to 10, parts by weight of a water-soluble, low viscosity cellulose derivative having a viscosity at 20° C. of 25–2,000, preferably 100–2,000, centipoises at 2 wt % aqueous solution.
2. as the foam stabilizer, 1 part by weight of a water-soluble, high-viscosity cellulose derivative, of which 2 wt % aqueous solution has a viscosity at 20° C. of more than 2,000 centipoises, preferably more than 4,000 centipoises, and
3. as the foaming accelerator, at least 1 part, preferably 1 to 30 parts, particularly 1 to 10 parts, by weight of at least 75% saponified, more preferably at least 85% saponified polyvinyl alcohol, of which 4 wt % aqueous solution has a viscosity at 20° C. of not higher than 70 centipoises;

ethoxylated materials including alcohols, alkyl phenols, and polyalcohols; sulfated materials including alcohols, ethoxylated alcohols, alkyl phenols, ethoxylated alkyl phenols, dialkyl esters of succinic acid, and the like; sulphosuccinamates having the empirical formula

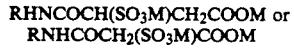
$RHNCOCH(SO_3M)CH_2COOM$ or
$RNHCOCH_2(SO_3M)COOM$ wherein R is preferably a saturated or unsaturated hydrocarbon group having at least 4, preferably 8 to 22, e.g., 12 to 18, or 10 to 14 carbon atoms, especially 12 carbon atoms, or an alkylalkoxy, alkylpolyalkoxy, alkenylalkoxy or alkenylpolyalkoxy group wherein the alkyl or alkenyl moiety has at least 4 e.g., to 9 to 22 preferably 10 to 14 carbon atoms, the alkoxy group is preferably ethyleneoxy and the group preferably contains an average of 1 to 20 alkyleneoxy moieties, e.g., 3 to 7 most preferably to 6, and each M is preferably alkali metal, aluminum or an organic base-the "M's" may be the same or different; higher secondary alcohol oxyalkylene sulfates having the empirical formula

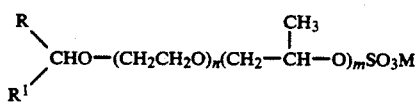

wherein R and $R^1$ are alkyl group with the sum of the total number of carbon atoms of both R and $R^1$ being about 10 to 20; n and m are each an integer of from 0 to 15, with n+m being 1 to 15, and M is an alkali metal atom, an ammonium group or an amine group; polyoxyethylene polyalcohol fatty acid esters; and various protein hydrolyzates. Protein hydrolyzates are made by hydrolyzing substances such as keratins and albumens which are found in animal hooves, horns, feathers and blood. They are employed as aqueous compositions (bases) which often contain one or more additives such as stabilizers, preservatives and complexing agents, e.g., iron salts, zinc salts, sodium citrate and sodium chloride, all of which are known additives to improve solution-stability and properties such as foam stability and foam-drainage. The hydrolyzed protein bases employed in the present invention usually have a pH of less than 9, e.g., from 6 to 8.

Other surfactants useful in the present invention include amine oxides having the empirical formula

$$RR'_xR''_yN(\rightarrow O)[(CH_2CH_2O)_nH]_m$$

wherein: R is an aliphatic group of about 8 to 18 carbon atoms, preferably an alkyl group of about 8 to 14 carbon atoms; R' is an aliphatic group of about 1 to 18 carbon atoms, preferably a methyl group; R'' is a methyl group; n is an integer of 1 or above, preferably one; and x, y, and m are zero or integers one or two wherein $x+y+m=2$.

Mixtures of amine oxides and sulfate esters of ethoxylated alcohols are particularly useful surfactants in the present invention.

The particle forming agents (PFA), which are the key to the success of the novel process to provide a particulate cementitious composition wherein at least 65% of the particles have the desired particle size, are water absorbent materials. They appear to function by absorbing water from the foamed slurry resulting in a coating of the solids in the foamed slurry over the surface of the PFA particles. As the water is absorbed by the particle forming agent, the foam is dissipated resulting in the cementitious material coating the particle forming agent. Thus the novel processes described herein can also be considered as process of coating water absorbent materials with cementitious compositions.

The PFA can be chosen from a wide variety of water absorbent materials. Representative PFA include: clays such as bentonite, attapulgite, hectorite, sepiolite, fullers earth, montmorillonite and the like; heat expanded perlite; exfoliated vermiculite; porous silicates; natural zeolites; ground vegetable materials, such as corn cobs, citrus pulp, beet pulp, rice hulls, oat hulls, waste cellulose, ground paper, cotton fiber from the delinting of cottonseed, peanut hulls, bagasse, alfalfa, ground cotton burrs (gin trash), and the like; water absorbent polymers such as pregelatinized starch, starch ether derivatives, starch graft copolymers, cellulose derivatives, and synthetic polymers or copolymers such as polymers containing a monomer selected from the group consisting of acrylic acid, acrylamide, acrylonitrile, methacrylic acid, methacrylamide, methyl acrylate, ethyl acrylate, methyl methacrylate, ethyl methacrylate, vinyl sulfonate, the alkali metal salts thereof, and mixtures thereof, and mixtures of these water absorbent materials.

In general, the particle size and concentration of the PFA controls the particle size of the particulate cementitious sorbents produced. Thus as the particle size of the PFA increases, the particle size of the particulate cementitious sorbents increases. Increasing the concentration of the PFA decreases the particle size of the particulate cementitious sorbents produced. To prepare the preferred cat box sorbents of this invention, it is preferred that at least 75% of the particles of an inorganic or ground vegetable material PFA are less than about 2000 microns and greater than about 149 microns, most preferably at least 65% of the particles of these PFA are greater than 250 microns. Water absorbent polymer PFA may be powdered materials depending on the water absorption characteristics of the polymer and the concentration added. Thus the so-called "super slurper" polymers, generally starch-acrylonitrile graft polymers, acrylic acid-acrylamide copolymers, and the like, which have a large water absorption capacity can be finely powdered.

For any particular PFA desired, the optimum particle size and concentration required to give the desired % recovery of the desired particles of the particulate cementitious sorbents can be readily determined for any foamed cementitious material containing slurry.

Additives to improve the sorption capacity of the absorbent compositions of this invention may be chosen from a wide variety of powdered water soluble polymers, such as those disclosed in the book entitled "Handbook of Water Soluble Gums and Resins," Robert L. Davidson, Ed., McGraw-Hill Book Co., 1980, incorporated herein by reference.

Exemplary water soluble polymers include: starch, gelatinized starch, and derivatives thereof, such as carboxymethyl starch, hydroxyethyl starch, hydroxypropyl starch, and mixed ether starches; cellulose ethers and esters such as hydroxyethyl cellulose, hydroxypropyl cellulose, methyl cellulose, sulfoethyl cellulose, carboxymethyl hydroxyethyl cellulose, hydroxyethyl methyl cellulose, hydroxypropyl methyl cellulose, cellulose sulfate, and the like; natural gums and synthetic biopolymers such as guar gum, locust bean gum, xanthan gum, sodium alginates, gum ghatti, gum karaya, gum tragacanth, and tamarind gum; pectins; casein and collagen protein colloids; and synthetic water soluble polymers, copolymers, terpolymers and the like, such as polyacrylates, polyvinyl alcohols, polyacrylamides, polyvinylpyrrolidones, poly(ethyleneoxide), polyvinyl acetates of varying degrees of hydrolysis, graft polymers, and the like.

Other additives which can be added to improve the water sorption capacity include powdered clays such as bentonite, attapulgite, hectorite, sepiolite, fullers earth, montmorillonite, and the like.

The plasticizers (water reducers is a synonymous term) or superplasticizers which may be utilized in the practice of this invention are well to known to those skilled in the cement art. They are described in U.S. Pat. Nos. 4,310,486 and 4,088,808 to Cornwell et al. and U.S. Pat. No. 4,495,228 to Cornwell. The water reducers are defined in ASTM C-494, types A and F mixtures. The purpose is to reduce the amount of water necessary to form a sufficiently plastic concrete mixture, (thereby improving the hardened material properties) to reduce setting time. One type of plasticizer is a mixture of (1) a condensate of formaldehyde and the sodium salt of naphthalene sulfonic acid (90%) and (2) 10% sodium gluconate as described in U.S. Pat. No. 3,686,133. There are numerous types of water reducers which are based upon condensation of alkaline earth metal sulfonate and formaldehyde. One preferred plasticizer is Daracem ® 100 which is obtained from W. R. Grace, Cambridge, Mass. and described in U.S. Pat. No. 4,460,720. These compositions include an alkali polyacrylate with a molecular weight between 500–25,000 with an alkaline earth lignin sulfonate or alkaline earth polynaphthaleneformaldehyde condensate to reduce the amount of water necessary to form a plastic mixture.

Other known materials in the amounts conventionally employed may be added provided that they do not adversely effect the characteristics of the lightweight particulate cementitious compositions of this invention. Such materials include odor control compounds, microbial inhibitors (bacteriostats, fungicides, etc.), attractants, dyes, pigments, powdered lightweight aggregates, wetting agents, materials to increase the hardening (set) time, and the like. Representative odor chemicals are disclosed in the following U.S. patents, incorporated herein by reference: U.S. Pat. No. 3,636,927 (Baum); U.S. Pat. No. 3,675,625 (Miller); U.S. Pat. No. 3,735,734 (Pierce); U.S. Pat. No. 3,816,577 (Neckermann); U.S. Pat. No. 3,921,581 (Brewer); U.S. Pat. No. 4,219,094 (Stockel); U.S. Pat. No. 4,355,593 (Stapley); U.S. Pat. No. 4,727,824 (Ducharme). Representative microbial inhibitors are disclosed in the following U.S. patents, incorporated herein by reference: U.S. Pat. No. 3,765,371 (Fisher); U.S. Pat. No. 3,828,731 (White); U.S. Pat. No. 3,892,846 (Wortham); U.S. Pat. No. 4,494,482 (Arnold); U.S. Pat. No. 4,517,919 (Benjamin et al.). A phermone-like attractant is disclosed in U.S. Pat. No. 4,263,873 (Christianson), incorporated herein by reference. A veterinary composition for preventing feline urological syndrome is disclosed in U.S. Pat. No. 4,402,941 (Vaillancourt), incorporated herein by reference.

The lightweight particulate cementitious sorbents of this invention remarkedly eliminate the odors from animal urine, particularly cat urine, over a considerable period of time. The sorbents sorb the urine and spread it over an area large enough that the moisture evaporates rapidly therefrom, thus eliminating the moisture necessary for the biological decomposition of the odor causing organic components of the urine. Additionally, the acids in the urine are neutralized further eliminating odor. The animal feces is periodically removed, preferably daily, thus eliminating the odors from the litter box. When used in this manner, the sorption capacity of the sorbent may be quite high as it is not desired to hold the urine within the sorbent for any extended period of time.

The lightweight sorptive cementitious sorbents of this invention have poor cohesiveness when wetted by the urine. Thus when the feces is removed from the litter box, usually only the sorbent attached to the feces is removed from the litter box. We have found that if it is desired to remove the urine from the litter box simultaneously with the feces, this can be accomplished by adding to the sorbents of this invention a water activated cohesive agent.

We have found that suitable water activated cohesive agents are selected from the group consisting of cold water soluble polymers, swelling clays, and mixtures thereof.

Particularly preferred cold water soluble polymers are cold water soluble polysaccharides and derivatives thereof. Preferred polysaccharides and alginates, carrageenates, agar gum, ghatti gum, karaya gum, tragacanth gum, pectins, gelatinized starch, tamarind gum, xanthan gum, other biopolymers, and derivatives of these polysaccharides, and cellulose derivatives, locust bean gum derivatives, starch derivatives, and mixtures of these polymers. Other cold water soluble polymers which provide cohesiveness to the lightweight sorptive cementitious compositions of this invention are synthetic polymers, including polyacrylates, polyvinyl alcohols, polyacrylamides, polyvinylpyrrolidones, poly (ethyleneoxide), polyvinyl acetates of varying degrees of hydrolysis, and mixtures thereof. Mixtures of the cold water soluble polysaccharides and the synthetic polymers can also be utilized. The term "cold water soluble polymers" as used herein is intended to mean polymers which, when mixed with water at ambient temperature, form a solution which exhibits non-Newtonian flow properties and film forming characteristics, and is not intended to comprise water swellable polymer whose "solutions" contain highly swollen gel particles of the polymer. The latter polymers are generally highly crosslinked water soluble polymers.

The water swelling clays useful as cohesiveness agents in the sorbents of this invention are smectite-type clays which have a cation exchange capacity of at least 50 milliequivalents per 100 grams of clay which have sufficient of the exchangeable cations being selected from the group consisting of sodium, lithium, and mixtures thereof, such that the clay exhibits osmotic swelling in deionized water.

The structure of the minerals of the smectite group of clay minerals comprises a 3-layer sheet structure wherein a central octahedral layer of principally alumina or magnesia is sandwiched between two tetrahedral layers of principally silica. In the tetrahedral layer, tetravalent Si is sometimes partly replaced by trivalent Al or Fe. In the octahedral sheet, there may be a replacement of trivalent Al by divalent Mg, or of divalent Mg by monovalent lithium atoms. In the smectite clay minerals where an atom of lower positive valence replaces one of higher valence, there results within the clay structure deficit of positive charge, or, in other words, an excess of negative charge. This excess of negative charge is compensated by the adsorption on the layer surfaces of cations which are too large to be accommodated within the interior of the crystal structure.

In the presence of water, the compensating cations on the layer surfaces may be exchanged by other cations when available in solution; hence they are called "exchangeable cations." The total amount of these cations can be determined analytically. This amount, expressed in milliequivalents per 100 gram of dry clay, is called the "cation exchange capacity" (CEC) or the "base exchange capacity" (BEC) of the clay.

In the stack of layers which form a smectite particle, the exchangeable cations are located on each side of each layer in the stack; hence they are present not only on the exterior surfaces of the particle but also in between the layers. When smectite clays are contacted with water or with water vapor, the water molecular penetrate between the layers. This so-called "interlayer swelling" leads to at most a doubling of the dry clay volume when four layers of water are adsorbed. However, for the swelling smectite-type clays useful in this invention, the swelling process continues and an amount of water is imbibed which is many times the volume of the original clay. The additional swelling is a result of the double-layer repulsive forces between the surfaces of the individual particles, which pushes them apart. The swelling is called "osmotic swelling" since the water tends to equalize the high concentration of ions between any two particles and the low concentration of ions far away from the particle surfaces in the bulk aqueous solution. As a result of this osmotic swelling, the clay/water system becomes a gel or colloidal solution depending on the concentration of the clay.

The water activated cohesive agent is preferably admixed with the lightweight sorptive cementitious sorbents of this invention. Alternatively, it can be coated onto the particles of the sorbents either from an aqueous solution or dispersion of the cohesive agent or from a non-aqueous suspension or slurry. It is particularly desirable to add the water activated cohesive agent soon after the particles have hardened sufficiently for subsequent handling. At this stage, the water activated cohesive agent also functions as a "parting" agent to keep the particles of cementitious sorbent from bonding together.

The minimum concentration of water activated cohesiveness agent added to the lightweight sorptive cementitious sorbents of this invention must be such that the mass (lump) of treated sorbent, formed upon being wet with an aqueous liquid such as urine, maintains its integrity upon movement, such as upon its removal from a cat litter box. In the case of the expensive water soluble polymers which function as water activated cohesiveness additives, the water soluble polymer is desireably chosen such that its concentration is from about 0.25% to about 10% by weight of the lightweight cementitious sorbent, preferably from about 0.5% to about 7.5%, and most preferably from about 0.5% to about 5% by weight. The concentration of swelling clay for adequate cohesiveness should be from about 1% to about 100% by weight of the lightweight particulate cementitious sorbent, preferably from about 2.5% to about 50%, and most preferably from about 5% to about 33% by weight.

It is preferred that the powdered water soluble polymer be admixed with the sorbent after sizing to the desired particle size range but before final drying, such that the moisture on further drying will help to adhere the water soluble polymer particles to the sorbent particles.

In order to prevent separation during shipping, it is preferred that the water activated cohesive agent have a particle size such that at least 35% by weight, most preferably at least 50%, of the particles are in the same particle size range exhibited by 90% by weight of the lightweight particulate cementitious sorbent particles. Thus in the case of the preferred lightweight particulate cementitious cat box sorbent of this invention, preferably at least 35% by weight of the water activated cohesive agent particles have a particle size in the 10/60 mesh range. Preferably the water swelling clay has a particle size range as follows: +10 mesh, less than 5%; 10/60 mesh, at least 60%; 60/100 mesh, less than 30%; −100 mesh, less than 10%.

The sorption capacity of the sorbents of this invention is preferably less than 3.0 g/cc if they are to be mixed with the water activated cohesive agent to form a cohesive cementitious sorbent.

Methods are known to measure the bulk density of solids. Thus the sample can be weighed into a graduated volumetric cylinder, compacted as by tapping, and measuring the volume of the compacted solids. The water sorption capacity for the purposes of describing this invention, is measured using the following procedure: a measured quantity of the sorbent is weighed into a pre-weighed or tared plastic weighing dish, generally 10.0 grams of sample; distilled water is added dropwise slowly until 2.0 grams has been added; the wetted sample is then covered with additional dry sample, generally 10 grams; this is aged five (5) minutes to allow for sorption and spreading of the water; thereafter the weight of the sample not wet by the water is determined by carefully pouring off the dry sample from the wetted sample; the sorption capacity in g/cc is calculated using the equation $$SC = \frac{20.0 - (\text{gm of non-wetted sample})}{2.0}$$

The particle size of the lightweight, sorptive, cementitious compositions of the present invention will depend on their end use. Generally the particle size will be less than 3 mesh, U.S. Standard Sieve Series (USSSS). Granular sorbents generally have a particle size in the range from about 3 mesh to about 60 mesh USSSS. Sorbents for use as the litter in cat boxes will generally range from 6/16 mesh or from 10/60 mesh, preferably from 10/50 mesh. The preferred lightweight sorptive cementitious sorbents of this invention have particle size distributions in the following ranges:

| Large Size | Regular Size |
|---|---|
| +6 mesh - <10% | +10 mesh - <5% |
| 6/16 mesh - >80% | 10/50 mesh - >75% |
| −16 mesh - <10% | 50/60 mesh - <15% |
|  | −60 mesh - <5% |

The bulk density of the sorbents of this invention is dependent on many interrelated variables, such as:

(a) the particular cementitious material, air-entraining/foaming agent, plasticizer, sorption capacity increasing additive, and particle forming agent used in preparing the sorbents, as well as the concentrations of each of these materials;

(b) the relative amount of water used in preparing the sorbents; and (c) the amount of water removal after the cementitious material has hardened. Thus the desired bulk density of the sorbents of this invention is obtained by controlling these variables during the manufacture of the sorbents.

The lightweight particulate cementitious compositions of the present invention have a bulk density in the range from about 0.3 g/cc to about 0.9 g/cc, preferably from about 0.45 g/cc to about 0.85 g/cc, and most preferably from about 0.5 g/cc to about 0.8 g/cc. The sorption capacity of the lightweight particulate cementitious compositions may vary over a wide range depending on the end use of the compositions. Thus if a cat box sorbent is desired which spreads the cat urine over a large area for rapid evaporation, then the sorption capacity, as defined herein, may be as low as 10 g/cc. A cat box sorbent which has been adapted to be cohesive when wetted with urine as discussed herein preferably has a sorption capacity greater than about 3 g/cc, preferably greater than 2 g/cc, and most preferably greater than 1.5 g/cc.

The following examples illustrate specific embodiments of the invention and are not intended to be limiting. Unless otherwise indicated, the air-entraining/foaming agent was HI-EXPANSION, a foaming agent sold by National Foam Systems. The bulk density and water sorption capacity were measured as set forth previously.

In the examples and throughout this specification, the following abbreviations may be used: g=grams; cc=cubic centimeters; gel=gallons; lb=pounds; psi=pounds per square inch; %=percent; °F.=degrees Fahrenheit; C=cement; CP=cement plasticizer; FA=foaming agent; P=plaster, PFA=particle forming agent; PFA-1=attapulgite clay; PFA-2=expanded perlite; PFA-3=calcium montmorillonite; PFA-4=calcium montmorillonite; and PFA-5=calcium montmorillonite; PFA-6=pregalatinized starch, PFA-7=Wyoming bentonite; USSSS=United States Standard Sieve Series; W=Water. The particle size distribution of the particle forming agents evaluated are as follows:

| Material | % by weight | | | | | | |
|---|---|---|---|---|---|---|---|
| | +10 | 10/20 | 20/30 | 30/40 | 40/50 | 50/100 | −100 |
| PFA-1 | 0 | 0 | 27.2 | 49.5 | 16.0 | 4.9 | 2.4 |
| PFA-2 | 0.2 | 55.4 | 15.9 | 8.1 | 4.1 | 4.8 | 11.4 |
| PFA-3 | 0 | 0.1 | 13.9 | 29.3 | 25.1 | 27.5 | 4.0 |
| PFA-4 | 0 | 0 | 2.1 | 38.3 | 37.5 | 21.7 | 0.4 |
| PFA-5 | 0 | 0 | 0 | 0 | 8.6 | 87.6 | 3.8 |
| PFA-6 | 0 | 1.0 | 9.0 | 26.2 | 39.3 | 22.4 | 2.2 |
| PFA-7 | 0 | 30.8 | 41.2 | 15.3 | 7.7 | 4.1 | 0.9 |

All mesh sizes used in the description of particle sizes are in terms of U.S. Standard Sieve Series, Fine Series of 1940. A particle size designated +X indicates the particles were retained on a sieve of size X mesh. A particle indicated Y/Z indicates that the particles passed through a sieve of mesh size Y and were retained on a sieve of mesh size Z. A particle size designated −W indicates that the particles all passed through a sieve of mesh size W. The term "powdered" when used herein is intended to mean that greater than about 25% of the particles thereof are less than about 100 mesh (149 microns).

EXAMPLE 1; SAMPLES 1-1 to 1-12

On a Multimixer there were mixed water (W) and a cement plasticizer (CP), a 40% active aqueous solution of the sodium salt of a sulfonated formaldehydenaphthalene condensate, GALFLO 3440, followed by the addition and mixing of IDEAL white Portland cement (C) in the weight ratio set forth in Table A. Thereafter there were added 1.55%, based on the weight of cement, of a 25% active commercial foaming agent, HI-EXPANSION. The mixture was mixed and allowed to foam by air-entrainment until the volume appeared to stabilize. There were then added with low shear mixing the amount of particle foaming agent (PFA) set forth in Table A. The cementitious slurries were placed in a container and set for a minimum of 4 hours to allow the particles to form and the cement to harden sufficiently such that the samples could be handled. Thereafter the samples were placed in pans and allowed to air dry at ambient temperature. After the moisture in the samples had stabilized, the samples were placed on a 10 mesh screen and sieved on a Combustion Engineering portable sieve shaker to determine the particle size distribution. The sorption capacity and/or bulk density were determined for the 10/50 mesh particles. The data obtained are given in Table B.

EXAMPLE 2

On a Multimixer there is mixed 60 parts of water with 10 parts of the cement plasticizer GALFLO 3440 followed by 215 parts of IDEAL white Portland cement. Thereafter there is added 41.85 parts of a pre-formed foam containing 4.65 parts of the commercial foaming agent of Example 1, followed by an additional 85 parts of IDEAL white Portland cement. After thorough mixing to produce a foamed cement slurry, there were then added at low shear the amount of particle forming agent (PFA) set forth in Table A. The cementitious slurries were placed in a container and processed as in Example 1. The data obtained are given in Table B.

EXAMPLE 3

Example 2 was repeated except that only 45.3 parts of water were initially mixed with the cement plasticizer. The data obtained are given in Table B.

EXAMPLE 4, SAMPLES 4-1 to 4-3

The procedure of Example 2 is repeated except that various other commercial foaming agents are used to prepare the foamed cement slurries, as follows: Sample 4-1, a 90% active alkyl ether sulfate (a sulfated ethoxylated alcohol); Sample 4-2 a 35% active alkyl ether sulfate; Sample 4-3, a 30% active dimethyl cocoamine oxide. The data obtained are given in Table B.

EXAMPLE 5

The procedure of Example 1 was repeated except that there was used as the foaming agent 1.55%, based on the weight of cement, of the commercial foaming agent used in preparing sample 4-1. The particles formed immediately such that a semi-solid mass was formed. This was aged to allow the cement to set sufficiently for subsequent handling. The data obtained are given in Table B.

EXAMPLE 6

The procedure of Example 1 was repeated except that there was used as the foaming agent 2.32%, based on the weight of cement, of a commercial 50% active dihydroxyethyl cocoamine oxide. The data obtained are given in Table B.

COMPARATIVE EXAMPLE A, SAMPLES A-1 TO A-4

Samples of foamed cements were prepared and evaluated by the procedure of Example 1. These samples have the composition set forth in Table A and the data obtained are given in Table B. These samples, which contained no particle forming agent did not form hardened particles on aging the cement slurry but were removed from the container as solid blocks. On drying, these would have required crushing generating a large amount of undesired fine particles. Therefore, the solid blocks were broken up before placing in pans to air dry.

Comparison of the particle size distribution of the air dried samples in Table B indicates the greatly enhanced product recovery of the desired 10/50 mesh size when the samples are prepared by the process of the present invention.

COMPARATIVE EXAMPLE B

A sample was prepared by the process set forth in Example 2 except that the sample contained no particle forming agent. On aging the foamed cement slurry the cement settled out in the container forming a hard dense layer. The sample was not processed further.

TABLE A

| Sample | W/C | CP/C | PFA-2/C | PFA | PFA/C |
|---|---|---|---|---|---|
| 1-1 | 1.0 | 0 | 0 | PFA-1 | 1.2 |
| 1-2 | 1.0 | 0 | 0 | PFA-1 | 0.6 |
| A-1 | 1.0 | 0 | 0 | None | 0 |
| 1-3 | 0.775 | 0 | 0 | PFA-1 | 0.3 |
| 1-4 | 0.775 | 0 | 0.3 | PFA-1 | 0.15 |
| A-2 | 0.775 | 0 | 0 | None | 0 |
| 1-5 | 0.525 | 0 | 0 | PFA-1 | 0.3 |
| 1-6 | 0.525 | 0 | 0 | PFA-1 | 0.15 |
| 1-7 | 0.525 | 0 | 0.225 | PFA-1 | 0.075 |
| A-3 | 0.525 | 0 | 0 | None | 0 |
| 1-8 | 0.275 | 0.033 | 0 | PFA-1 | 0.1 |
| 1-9 | 0.275 | 0.033 | 0.1 | PFA-1 | 0.05 |
| A-4 | 0.275 | 0.033 | 0 | None | 0 |
| 1-10 | 0.525 | 0 | 0 | PFA-3 | 0.15 |
| 1-11 | 0.525 | 0 | 0 | PFA-4 | 0.15 |
| 1-12 | 0.525 | 0 | 0 | PFA-5 | 0.15 |
| 2 | 0.324 | 0.033 | 0.075 | PFA-1 | 0.05 |
| 3 | 0.275 | 0.033 | 0.1 | PFA-1 | 0.05 |
| 4-1 | 0.275 | 0.033 | 0.1 | PFA-1 | 0.05 |
| 4-2 | 0.275 | 0.033 | 0.1 | PFA-1 | 0.05 |
| 4-3 | 0.275 | 0.033 | 0.1 | PFA-1 | 0.05 |
| 5 | 0.65 | 0 | 0 | PFA-1 | 0.3 |
| 6 | 0.21 | 0.465 | 0.1 | PFA-1 | 0.05 |

TABLE B

| Sample | % Moisture Lost on Air Drying | Particle Size Distribution Weight % +10 | 10/50 | −50 | 10/50 Bulk Density g/cc | Sorption Capacity g/cc |
|---|---|---|---|---|---|---|
| 1-1 | 16.6 | 0 | 91.9 | 8.1 | 0.71 | 2.6 |
| 1-2 | 13.5 | 0 | 96.1 | 3.9 | 0.71 | 3.2 |
| A-1 | 32.5 | 0 | 77.9 | 22.1 | 0.33 | 1.7 |
| 1-3 | 22.5 | 24.1 | 63.0 | 12.9 | 0.52 | 1.1 |
| 1-4 | 13.2 | 0.2 | 94.9 | 4.9 | 0.39 | 1.7 |
| A-2 | 23.8 | 15.2 | 65.2 | 19.5 | 0.37 | 1.1 |
| 1-5 | 15.3 | 0.9 | 98.2 | 0.9 | 0.83 | 2.6 |
| 1-6 | 14.7 | 20.2 | 72.0 | 7.8 | 0.70 | 2.1 |
| 1-7 | 15.1 | 2.3 | 94.2 | 3.5 | 0.52 | 2.3 |
| A-3 | 17.5 | 38.3 | 50.7 | 11.0 | 0.52 | 2.6 |
| 1-8 | — | 22.3 | 73.8 | 3.9 | 1.0 | 6.0 |
| 1-9 | — | 3.7 | 94.1 | 2.2 | 0.83 | 2.9 |
| A-4 | 7.1 | 25.7 | 64.7 | 9.6 | 0.82 | 5.3 |
| 1-10 | 16.6 | 0.4 | 89.6 | 10.0 | 0.69 | 3.0 |
| 1-11 | 16.6 | 1.4 | 89.9 | 8.6 | 0.68 | 3.0 |
| 1-12 | 16.7 | 0.2 | 91.0 | 8.8 | 0.68 | 2.7 |
| 2 | 5.9 | 10.5 | 83.3 | 6.2 | 0.69 | 2.2 |
| 3 | 9.1 | 10.7 | 87.1 | 2.2 | 0.75 | 2.8 |
| 4-1 | 8.8 | 16.7 | 81.2 | 2.1 | 0.57 | 3.5 |
| 4-2 | 7.5 | 8.8 | 89.2 | 2.0 | 0.62 | 2.0 |
| 4-3 | 8.2 | 10.6 | 86.4 | 3.0 | 0.59 | 4.5 |
| 5 | — | 0.6 | 95.6 | 3.8 | 0.68 | 2.8 |
| 6 | 8.9 | 1.2 | 97.9 | 0.9 | 0.78 | 3.7 |

EXAMPLE 7

An aqueous solution to be foamed containing 1 part by weight of the commercial foaming agent used in Example 1 and 40 parts by weight water was placed in a commercial foam generator. Upon applying 100 psi air pressure to the foam generator, a foam is generated consuming 0.111 gallons of the solution per second.

To a commercial mortar mixer there were added 60 lb of Portland cement and 3 gal of water. After thorough mixing there were added 0.75 lb of the commercial foaming agent used in Example 1. After thorough mixing there were added 8 seconds of foam from the foam generator. This was thoroughly mixed to prepare a foamed cement slurry. There were then added a particle forming agent comprising pre-gelatinized starch having the particle size distribution set forth hereinbefore (PFA-6).

After thorough mixing the slurry was placed in a container and aged for a period of time such that the particles formed and the cement hardened sufficiently that the particles could be handled. The particles were then placed in trays and dried in an oven at 220° F. After drying the particle size distribution was obtained and the 10/40 mesh particles evaluated. The data obtained are given in Table C.

EXAMPLE 8

The procedure of Example 7 was repeated except that 12 seconds of foam were added to the mixer. The data obtained are given in Table C.

EXAMPLE 9

The procedure of Example 7 was repeated that the particle forming agent was a fine powdered pre-gelatinized starch. The data obtained are given in Table C. Although this powdered pre-gelatinized starch functioned as a particle forming agent, the % recovery of the desired 10/40 mesh particles was less than when the larger particle size PFA, as in Example 7, was used. The % recovery of particles in a smaller or broadened particle size range would have been in excess of about 65%.

EXAMPLE 10

The procedure of Example 7 was repeated except that the particle forming agent was a fine powdered attapulgite clay. The data obtained are given in Table C.

EXAMPLE 11

To a one cubic yard foamed cement mixer there were added 564 lb of Portland cement and 27.5 gal of water. After thorough mixing there were added 7 lb of the commercial foaming agent used in Example 1. After thorough mixing there were added 75 seconds of foam from the foam generator used in Example 7. After thoroughly blending in the foam there were added 56 lb of the particle forming agent used in Example 7. Thereafter the slurry and particles were processed as in Example 7. The data obtained are given in Table C.

EXAMPLE 12

Example 11 was repeated except that there were initially added to the cement slurry only 5 lb of the foaming agent. The data obtained are given in Table C.

EXAMPLE 13

Example 11 was repeated except that there were added only 28 lb of the particle forming agent. The data obtained are given in Table C.

EXAMPLE 14

Example 13 was repeated except that there were added 3 lb of the foaming agent initially to the cement slurry. The data obtained are given in Table C.

EXAMPLE 15

Example 11 was repeated except that there were added as the particle forming agent 28 lb of PFA-1. The data obtained are given in Table C.

EXAMPLE 16

Example 11 was repeated except that there were added as the particle forming agent 56 lb of PFA-1. The data obtained are given in Table C.

TABLE C

| Example | Initial Weight Ratio W/C | Initial Weight Ratio FA/C | Final Weight Ratio W/C | Final Weight Ratio FA/C | Particle Size Distribution Weight % +10 | Particle Size Distribution Weight % 10/40 | Particle Size Distribution Weight % −40 | 10/40 Bulk Density g/cc | 10/40 Sorption Capacity g/cc |
| --- | --- | --- | --- | --- | --- | --- | --- | --- | --- |
| 7  | 0.4165 | 0.0128 | 0.5365 | 0.0158 | 3.8  | 88.3 | 7.9  | 0.79 | 3.4 |
| 8  | 0.4165 | 0.0128 | 0.5967 | 0.016  | 1.4  | 93.4 | 5.2  | 0.83 | 2.1 |
| 9  | 0.4165 | 0.0128 | 0.5365 | 0.0158 | 9.0  | 64.9 | 26.1 | 0.86 | 3.0 |
| 10 | 0.4165 | 0.0128 | 0.5365 | 0.0158 | 5.9  | 80.4 | 13.7 | 0.77 | 3.5 |
| 11 | 0.406  | 0.0124 | 0.526  | 0.0154 | 0.4  | 85.5 | 14.1 | 0.86 | 2.3 |
| 12 | 0.406  | 0.0089 | 0.526  | 0.0119 | 5.0  | 76.1 | 18.9 | 0.90 | 2.4 |
| 13 | 0.406  | 0.0089 | 0.526  | 0.0119 | 7.4  | 83.3 | 9.3  | 0.83 | — |
| 14 | 0.406  | 0.0053 | 0.526  | 0.0083 | 9.1  | 77.8 | 13.1 | 0.87 | — |
| 15 | 0.406  | 0.0124 | 0.526  | 0.0154 | 27.4 | 65.6 | 7.0  | 0.59 | — |
| 16 | 0.406  | 0.0124 | 0.526  | 0.0154 | 11.9 | 77.5 | 10.6 | 0.83 | — |

EXAMPLE 17, SAMPLES 17-1 TO 17-6

On a Multimixer there were mixed water and commercial plaster, $CaSO_4 \cdot 0.5H_2O$, to give the water to plaster weight ratio (W/P) indicated in Table D. Thereafter there were added to amount of the foaming agent used for sample 4-1, example 4, to give the concentration of foaming agent indicated in Table D. Continued mixing entrapped air in the slurry. After the foam volume appeared to stabilize, there were mixed with the foamed slurry by spatulation an amount of PFA-1 to give the PFA/P ratio indicated in table D. The slurries were placed in a container and set to allow the particles to form and the plaster to harden sufficiently such that the samples could be handled. Thereafter the samples were placed in pans and allowed to air dry at ambient temperature. After drying the particles were sieved to determine the particle size distribution. The sorption capacity and/or bulk density were determined for the 10/20 mesh particles. The data obtained are given in Table D.

COMPARATIVE EXAMPLES C,D

A foamed plaster was prepared by the process of Example 17 except that no particle forming agent was added. The data obtained are given in Table D. The particles are softer than the particles of Example 17.

Thereafter, the hydrated lump of sample was air dried for 1½ hours. If the lump retained sufficient cohesiveness that it could be handled, it was placed in a beaker of water and allowed to further hydrate overnight. The beaker was then swirled to determine the effect of the water on the lump. The data and observations are given in Table F.

As Table E indicates, a wide variety of water soluble polymers were evaluated. Five of these gave poor, unacceptable cohesiveness. Several of the polymers were evaluated at 2%, 3.5%, and 5% by weight, based on the admixture. The data and observations are given in Table G.

It is believed that the Sorption Rate should be fast in the case of cat litter so that the cat's natural covering tendency does not spread the urine in the litter. A "slow" rating in Tables F and G indicates that the water formed a pool on the surface of the sample before it was sorbed. A cohesiveness rating of "good" indicates that the hydrated lump of sample could be removed from the remainder of the sample without breaking up. The hydrated lump of sample should remain intact on drying. Thus a lump which is "friable" indicates that a portion of the wetted sample would remain in the litter box upon its attempted removal. Where it is desired to flush the hydrated lump of litter down a commode, then it is preferable that the hydrated lump should not stick

TABLE D

| Sample | W/P | FA* | PFA/P | % Moisture Lost on Air Drying | Particle Size Distribution Weight % +10 | Particle Size Distribution Weight % 10/20 | Particle Size Distribution Weight % −20 | 10/20 Bulk Density g/cc | 10/20 Sorption Capacity g/cc |
| --- | --- | --- | --- | --- | --- | --- | --- | --- | --- |
| 17-1 | 2.0  | 2.0 | 1.2  | 41.6 | 0   | 55.5 | 44.5 | 0.47 | 1.6 |
| 17-2 | 1.5  | 1.3 | 0.75 | 36.0 | 0   | 71.3 | 28.7 | 0.52 | 2.4 |
| 17-3 | 1.0  | 3.0 | 0.60 | 32.8 | 0   | 76.9 | 23.1 | 0.54 | 2.3 |
| 17-4 | 1.0  | 2.0 | 0.60 | 33.1 | 0   | 80.6 | 19.4 | 0.57 | 2.2 |
| 17-5 | 1.0  | 2.0 | 0.30 | 34.6 | 0   | 44.3 | 55.7 | 0.56 | 2.0 |
| 17-6 | 0.67 | 3.0 | 0.40 | 23.0 | 2.8 | 56.1 | 41.1 | 0.66 | 2.6 |
| C    | 1.0  | 2.0 | 0    | 39.2 | 0.  | 25.5 | 74.5 | 0.56 | 3.4 |
| D    | 0.67 | 2.0 | 0    | 27.3 | 0.4 | 9.8  | 89.8 | 0.68 | 3.7 |

*% by weight of foaming agent, based on the weight of water in the slurry

EXAMPLE 18

Various cold water soluble polymers were evaluated as water activated cohesive agents as discussed in the specification hereinbefore. Thus a sample of a lightweight cementitious sorbent having a bulk density of 0.816 g/cc, a sorption capacity of 4.0 g/cc, and no cohesiveness, was mixed with 10% by weight, based on the admixture of the water soluble polymers listed in Table E. The sorption capacity test was then run on the admixture, and the rate of water sorption and the cohesiveness of the hydrated lump of sample were noted.

to the commode or sewer line on continued hydration. In this case, the concentration of the cohesiveness agent should be chosen such that the hydrated lump remains intact or breaks up on continued hydration in water. Preferably the hydrated lump will remain intact.

TABLE E

POTENTIAL COHESIVENESS AGENTS EVALUATED

| Cohesiveness Agent Number | Cohesive Agent (CA) |
|---|---|
| — | Starches Modified |
| CA-1 | Pregelatinized Starch |
| CA-2, 3 | Pregelatinized Starch Derivative |
| CA-4 | Hydroxyethyl Starch |
| CA-5, 6 | Carboxymethyl Starch |
| CA-7, 8 | Hydroxypropyl Starch Phosphate |
| CA-9-12 | Starch Derivative |
| CA-13 | Pre-cooked Starch |
| | Cellulose Derivatives |
| CA-14-19 | Carboxymethyl Cellulose |
| CA-20 | Hydroxyethyl Cellulose |
| CA-21 | Carboxymethyl Hydroxyethyl Cellulose |
| CA-22 | Hydroxypropyl Hydroxyethyl Cellulose |
| CA-23-24 | Ethyl Hydroxyethyl Cellulose |
| CA-25 | Methyl Cellulose |
| CA-26-28 | Hydroxypropyl Methyl Cellulose |
| | Other Water Soluble Polymers |
| CA-29 | Polysaccharide Biopolymer |
| CA-30, 31 | Guar Gum Derivatives |
| Ca-32 | Modified Polysaccharide Gum |
| CA-33 | Synthetic Non-ionic Polymer |
| CA-34 | Synthetic Anionic Polymer |
| CA-35, 36 | Synthetic Cationic Polymer |
| CA-37 | Poly(ethyleneoxide) |

TABLE F

| Cohesiveness Agent | % CA | Sorption Capacity g/cc | Sorption Rate | Cohesiveness | Characteristics of Lump Dry | Wet |
|---|---|---|---|---|---|---|
| CA-1 | 10 | 2.25 | Fast | Good | Hard | Intact |
| CA-2 | 10 | 2.75 | Fast | Good | Spongy | Partially Breaks Up |
| CA-3 | 10 | * | Fast | * | * | * |
| CA-4 | 10 | 1.75 | Fast | Good | Spongy | Slightly Breaks up |
| CA-5 | 10 | 2.2 | Slow | Good | Hard | Stuck to Container |
| CA-6 | 10 | 2.45 | Fast | Good | Hard | Partially Breaks Up |
| CA-7 | 10 | 1.8 | Slow | Good | Spongy | Intact |
| CA-8 | 10 | 2.25 | Slow | Good | Hard | Slightly Breaks Up |
| CA-9 | 10 | 3.25 | Slow | Good | Hard | Intact |
| CA-10 | 10 | 2.5 | Fast | Good | Spongy | Intact |
| CA-11 | 10 | 3.25 | Fast | Poor | — | — |
| CA-12 | 10 | 1.95 | Fast | Cood | Hard | Slightly Breaks Up |
| CA-14 | 10 | 0.95 | Slow | Good | Spongy | Stuck to Container |
| CA-15 | 10 | 1.6 | Slow | Good | Spongy | Intact |
| CA-16 | 10 | 1.4 | Slow | Good | Hard | Stuck to Container |
| CA-17 | 10 | 1.65 | Slow | Good | Spongy | Stuck to Container |
| CA-18 | 10 | 1.5 | Fast | Good | Spongy | Stuck to Container |
| CA-19 | 10 | 2.2 | Fast | Good | Spongy | Stuck to Container |
| CA-20 | 10 | 1.4 | Slow | Good | Spongy | Slightly Breaks Up |
| CA-21 | 10 | 1.65 | Slow | Good | Spongy | Stuck to Container |
| CA-22 | 10 | 1.85 | Slow | Good | Spongy | Stuck to Container |
| CA-23 | 10 | 1.55 | Fast | Good | Spongy | Stuck to Container |
| CA-24 | 10 | 1.9 | Fast | Good | Spongy | Stuck to Container |
| CA-25 | 10 | 1.1 | Slow | Good | Spongy | Stuck to Container |
| CA-26 | 10 | 1.2 | Slow | Good | Spongy | Stuck to Container |
| CA-27 | 10 | 1.45 | Slow | Good | Spongy | Stuck to Container |
| CA-28 | 10 | 1.6 | Slow | Good | Spongy | Stuck to Container |
| CA-29 | 10 | 1.4 | Slow | Good | Spongy | Intact |
| CA-30 | 10 | 1.75 | Fast | Fair | Crumbly | — |
| CA-31 | 10 | 2.7 | Fast | Poor | — | — |
| CA-32 | 10 | 1.75 | Fast | Good | Spongy | Slightly Breaks Up |
| CA-33 | 10 | 3.05 | Fast | Good | Spongy | Stuck to Container |
| CA-34 | 10 | 2.3 | Fast | Good | Spongy | Stuck to Container |
| CA-35 | 10 | 2.7 | Fast | Good | Spongy | Stuck to Container |
| CA-36 | 10 | 2.9 | Fast | Poor | — | — |
| CA-37 | 10 | 1.5 | Slow | Good | Hard | Stuck to Container |

*Very poor cohesiveness. Sorption Capacity could not be determined.

TABLE G

| Cohesiveness Agent | % CA | Sorption Capacity g/cc | Sorption Rate | Cohesiveness | Characteristics of Lump Dry | Wet |
|---|---|---|---|---|---|---|
| CA-1 | 10 | 3.0 | Fast | Good | Hard | Partially Breaks Up |
| CA-2 | 5 | 3.4 | Fast | Poor | — | — |
| CA-4 | 5 | 2.45 | Fast | Good | Spongy | Slightly Breaks Up |
| CA-6 | 5 | 2.7 | Fast | Good | Friable | Slightly Breaks Up |
| CA-10 | 5 | 3.3 | Fast | Good | Friable | Breaks Up |
| CA-12 | 5 | 1.95 | Fast | Poor | — | — |
| CA-13 | 5 | 2.65 | Fast | Good | Hard | Intact |
| CA-14 | 5 | 1.65 | Fast | Good | Hard | Stuck to Container |
| CA-16 | 5 | 1.1 | Slow | Good | Hard | Stuck to Container |
| CA-18 | 5 | 2.05 | Fast | Good | Spongy | Stuck to Container |
| CA-19 | 5 | 2.5 | Fast | Poor | — | — |
| CA-20 | 5 | 1.5 | Slow | Good | Spongy | Stuck to Container |
| CA-21 | 5 | 1.9 | Slow | Good | Spongy | Stuck to Container |

TABLE G-continued

| Cohesiveness Agent | % CA | Sorption Capacity g/cc | Sorption Rate | Cohesiveness | Characteristics of Lump Dry | Wet |
|---|---|---|---|---|---|---|
| CA-23 | 5 | 1.75 | Fast | Good | Spongy | Stuck to Container |
| CA-25 | 5 | 1.55 | Slow | Good | Spongy | Slightly Breaks Up |
| CA-26 | 5 | 1.75 | Slow | Good | Hard | Stuck to Container |
| CA-32 | 5 | 1.4 | Fast | Good | Spongy | Intact |
| CA-34 | 5 | 2.55 | Fast | Poor | — | — |
| CA-16 | 3.5 | 2.45 | Fast | Good | Hard | Stuck to Container |
| CA-18 | 3.5 | 2.5 | Fast | Poor | — | — |
| CA-20 | 3.5 | 2.0 | Fast | Good | Spongy | Breaks Up |
| CA-23 | 3.5 | 2.35 | Fast | Good | Hard | Breaks Up |
| CA-25 | 3.5 | 1.85 | Fast | Good | Friable | Breaks Up |
| CA-26 | 3.5 | 1.9 | Fast | Good | Hard | Stuck to Container |
| CA-32 | 3.5 | 2.1 | Fast | Good | Hard | Slightly Breaks Up |
| CA-34 | 3.5 | 3.0 | Fast | Poor | — | — |
| CA-1 | 2 | 3.6 | Fast | Poor | — | — |
| CA-20 | 2 | 1.8 | Fast | Good | Spongy | Slightly Breaks Up |
| CA-25 | 2 | 1.8 | Fast | Good | Friable | Breaks Up |
| CA-32 | 2 | 2.2 | Fast | Good | Hard | Breaks Up |

EXAMPLE 19, SAMPLES 19-1 THROUGH 19-10

A series of lightweight sorptive cementitious materials was prepared using a modified in-situ foam generation technique. A clay slurry containing 200 grams of water and 8 grams of Wyoming bentonite while continuously mixing was flocculated with 0.5 grams of sodium hydroxide. The amount of tall oil fatty acid indicated in Table H was added which created a large amount of foam. This was followed by the concentration of a Dow Chemical Co. polystyrene latex 288A indicated in Table H which further enhanced the generation of foam. The foam was then dissipated by the addition of 4 grams of lime. The samples containing no polystyrene latex seemed to be completely defoamed. Thereafter the amount of Class I Portland cement indicated in Table H was added and the mixing continued to form a uniform slurry. The samples were then dried in an oven at 120° C. overnight, crushed, sieved in the 30/60 USSSS particle size range, and evaluated as sorbents as indicated in Table H.

EXAMPLE 20, SAMPLES 20-1 THROUGH 20-3

The procedure of Example 19 was repeated except that there was used 20 grams of the following latexes in place of the Dow Latex 288A: Example 21 - BASF STYROFAN ND 859; Example 22 - BASF BUTOFAN NS 103; Example 23 - BASF BUTONOL NS 125. The results obtained are also set forth in Table H.

TABLE H

| Example | grams TOFA[1] | grams Latex | grams Portland Cement | BD g/cc | SC g/cc |
|---|---|---|---|---|---|
| 19-1 | 0 | 0 | 30 | 0.201 | 0.40 |
| 19-2 | 2 | 0 | 30 | 0.179 | 0.30 |
| 19-3 | 4 | 0 | 30 | 0.254 | 0.625 |
| 19-4 | 2 | 0 | 200 | 0.495 | 1.12 |
| 19-5 | 4 | 0 | 200 | 0.520 | 0.915 |
| 19-6 | 4 | 10 | 200 | 0.439 | 0.80 |
| 19-7 | 4 | 20 | 200 | 0.445 | 0.72 |
| 19-8 | 4 | 30 | 200 | 0.415 | (2) |
| 19-9 | 4 | 40 | 200 | 0.399 | (2) |
| 19-10 | 0 | 30 | 200 | 0.524 | 1.4 |
| 20-1 | 4 | 20 | 200 | 0.495 | 0.80 |
| 20-2 | 4 | 20 | 200 | 0.530 | 0.90 |
| 20-3 | 4 | 20 | 200 | 0.521 | 0.95 |

[1]TOFA = tall oil fatty acid
[2]hydrophobic, no water absorption

EXAMPLE 21, SAMPLES 21-1 THROUGH 21-3

508 g of Wyoming bentonite clay was mixed in 12.7 kg water for 20 minutes to disperse and hydrate the clay. While mixing, there were successively added and mixed therewith the following: 31 g sodium hydroxide—5 minutes; 254 g crude tall oil—5 minutes; 254 g lime—10 minutes; 12.7 kg Portland cement, Class 1—20 minutes. After aging at ambient temperature to set, a portion of the sample was dried in an oven at 150° F., crushed, and sieved to a 30/60 mesh particle size. This sample is designated 21-1. A portion of the slurry was air dried, crushed, and sieved to a 30/60 mesh particle size. This sample is designated 21-2. A part of sample 21-2 was further oven dried to remove 28.6% moisture and designated 21-3. These samples were tested for bulk density and sorption capacity. The data obtained are tabulated as follows:

| Sample | BD, g/cc | SC, g/cc |
|---|---|---|
| 21-1 | 0.52 | 1.25 |
| 21-2 | 0.64 | * |
| 21-3 | 0.50 | 0.80 |

*Hydrophobic. Did not absorb the water.

A portion of sample 21-1 was mixed with twice its weight of a 12.5% slurry of ground oat hulls and dried in an oven at about 125° C. The 30/60 mesh particles had a sorption capacity of 0.7 g/cc. Another portion of sample 21-1 was similarly treated with 1.5 times its weight of a 10% slurry of ground oat hulls. The 30/60 mesh particles had a sorption capacity of 0.6 g/cc.

What is claimed is:

1. A process of preparing a lightweight particulate cementitious composition comprising a water absorbent material coated with a cementitious material, which comprises: (1) forming a foamed aqueous slurry containing water and a cementitious material in a water to cementitious material weight ratio from about 0.2 to about 1.2, the slurry containing from about 0.1% to about 5%, by weight of the water, of a foaming surfactant, and from 0% to about 20% based on the weight of the cementitious material, of a plasticizer for the cementitious material; (2) mixing with the foamed slurry up to about 120%, based on the weight of the cementitious material, of a water absorbent particulate particle forming agent selected from the group consisting of clays, heat expanded perlite, exfoliated vermiculite, porous silicates, ground vegetable materials, water absorbent polymers, and mixtures thereof; and (3) aging the treated foamed slurry for a period of time sufficient for the particles of the lightweight particulate cementitious composition to form and harden for subsequent handling without crushing the particles, whereby the water absorbent particle forming agent is coated with the cementitious composition; wherein the particle size and concentration of the particle forming agent are selected such that at least 65% of the particles of the lightweight particulate cementitious composition have a particle size less than 3 mesh, U.S. Standard Sieve Series; and wherein the cementitious material is Portland cement.

2. The process of claim 1 wherein there is admixed with the slurry up to about 10%, based on the weight of the cementitious material, of a sorption capacity increasing additive.

3. The process of claim 2 wherein the sorption capacity increasing additive is selected from the group consisting of water soluble polymers, clays, and mixtures thereof.

4. The process of claim 1 wherein the particulate particle forming agent has a particle size such that at least 75% of the particles thereof are less than about 2000 microns and greater than about 149 microns, and wherein the lightweight particulate cementitious composition has a particle size such that greater than 75% of the particles thereof are less than 10 mesh and greater than 50 mesh.

5. The process of claim 1 wherein the water to cementitious material weight ratio is less than about 0.4 and wherein the concentration of plasticizer is greater than 0%.

6. The process of claim 5 wherein the slurry contains up to about 40%, based on the weight of the cementitious material, of the particle forming agent.

7. The process of claim 1, 5, or 6 wherein the particulate particle forming agent has a particle size distribution such that at least about 75% of the particles thereof are greater than about 149 microns, and wherein the lightweight particulate cementitious composition has a particle size such that greater than 75% of the particles thereof are less than 10 mesh and greater than 50 mesh.

8. A process of preparing a lightweight particulate cementitious composition comprising a water absorbent material coated with a cementitious material, which comprises: (1) forming an aqueous slurry containing water and a cementitious material in a water to cementitious material weight ratio from about 0.15 to about 1.0, the slurry containing from about 0% to about 20%, based on the weight of the cementitious material, of a plasticizer and from about 0.1% to about 5%, by weight of the water, of a surfactant; (2) foaming the aqueous slurry by either (a) vigorously mixing the slurry and entraining air therein, (b) mixing with the aqueous slurry a pre-formed foam containing from about 1% to about 10% by weight of a foaming agent, or (c) both (a) and (b); (3) mixing with the foamed slurry up to about 120%, based on the weight of the cementitious material, of a water absorbent particle forming agent selected from the group consisting of clays, heat expanded perlite, exfoliated vermiculite, porous silicates, ground vegetable materials, water absorbent polymers, and mixtures thereof; and (4) aging the treated foamed slurry for a period of time sufficient for the particles of the lightweight particulate cementitious composition to form and harden for subsequent handling without crushing the particles, whereby the water absorbent particle forming agent is coated with the cementitious composition; wherein the particle size and concentration of the particle forming agent are selected such that at least 65% of the particles of the lightweight particulate cementitious composition have a particle size less than 3 mesh, U.S. Standard Sieve Series; and wherein the cementitious material is Portland cement.

9. The process of claim 8 wherein there is mixed with the aqueous slurry, either before or after the foaming thereof, up to about 10%, based on the weight of the cementitious material, of a sorption capacity increasing additive.

10. The process of claim 9 wherein the sorption capacity increasing additive is a powdered material selected from the group consisting of water soluble polymers, clays, and mixtures thereof.

11. The process of claim 8 wherein particulate particle forming agent has a particle size such that at least 75% of the particles thereof are less than about 2000 microns and greater than about 149 microns, and wherein the lightweight particulate cementitious composition has a particle size such that greater than 75% of the particles thereof are less than 10 mesh and greater than 50 mesh.

12. The process of claim 8 wherein the water to cementitious material weight ratio is less than about 0.4 and wherein the concentration of plasticizer is greater than 0%.

13. The process of claim 12 wherein the slurry contains up to about 40%, based on the weight of the cementitious material of the particle forming agent.

14. The process of claim 8, 12 or 13 wherein the particulate particle forming agent has a particle size distribution such that at least 75% of the particles thereof are greater than about 149 microns, and wherein the lightweight particulate cementitious composition has a particle size such that greater than 75% of the particles thereof are less than 10 mesh and greater than 50 mesh.

15. The process of preparing a lightweight particulate cementitious composition the particles of which are cohesive when contacted with an aqueous liquid comprising mixing with the lightweight particulate composition of claim 1, 4, 5, 6, 8, 11, 12, or 13, a water activate cohesive agent.

16. The process of preparing a lightweight particulate cementitious composition the particles of which are cohesive when contacted with an aqueous liquid comprising mixing with the lightweight particulate cementitious composition of claim 1, 4, 5, 6, 8, 11, 12, or 13, a water activated cohesive agent selected from the group consisting of cold water soluble polymers, swelling clays, and mixtures thereof.

17. A method of minimizing the odor from cat urine which comprises sorbing the urine in a lightweight sorptive cementitious cohesive sorbent and thereafter removing the sorbed urine in the form of a cohesive mass of the sorbent, the sorbent being prepared by mixing a water activated cohesive agent with the lightweight particulate cementitious composition prepared by the process of claim 1 or 8, the water activated cohesive agent being selected from the group consisting of water soluble polymers, swelling clays, and mixtures thereof.

18. The lightweight particulate cementitious sorbent comprising a water absorbent material coated with a cementitious material prepared by the process of claim 1, 2, 3, 4, 5, 6, 8, 9, 10, 11, 12, or 13.

19. The lightweight particulate cementitious sorbent comprising a water absorbent coated with a cementitious material prepared by the process of claim 16.

20. The lightweight particulate cementitious sorbent comprising a water absorbent material coated with a cementitious material prepared by the process of claim 1, 4, 8, or 11 wherein the sorbent has a bulk density in the range from about 0.3 g/cc to about 0.9 g/cc and an apparent water sorption capacity greater than 10 grams of sorbent per cc of water.

21. The lightweight particulate cementitious sorbent comprising a water absorbent material coated with a cementitious material prepared by the process of claim 16 wherein the sorbent has a bulk density in the range from about 0.3 g/cc to about 0.9 g/cc and an apparent water sorption capacity greater than 10 grams of sorbent per cc of water.

* * * * *